Aug. 16, 1932.  L. A. PARADISE  1,872,172
WEAR PLATE FOR HARVESTER KNIFE BARS
Filed May 22, 1930
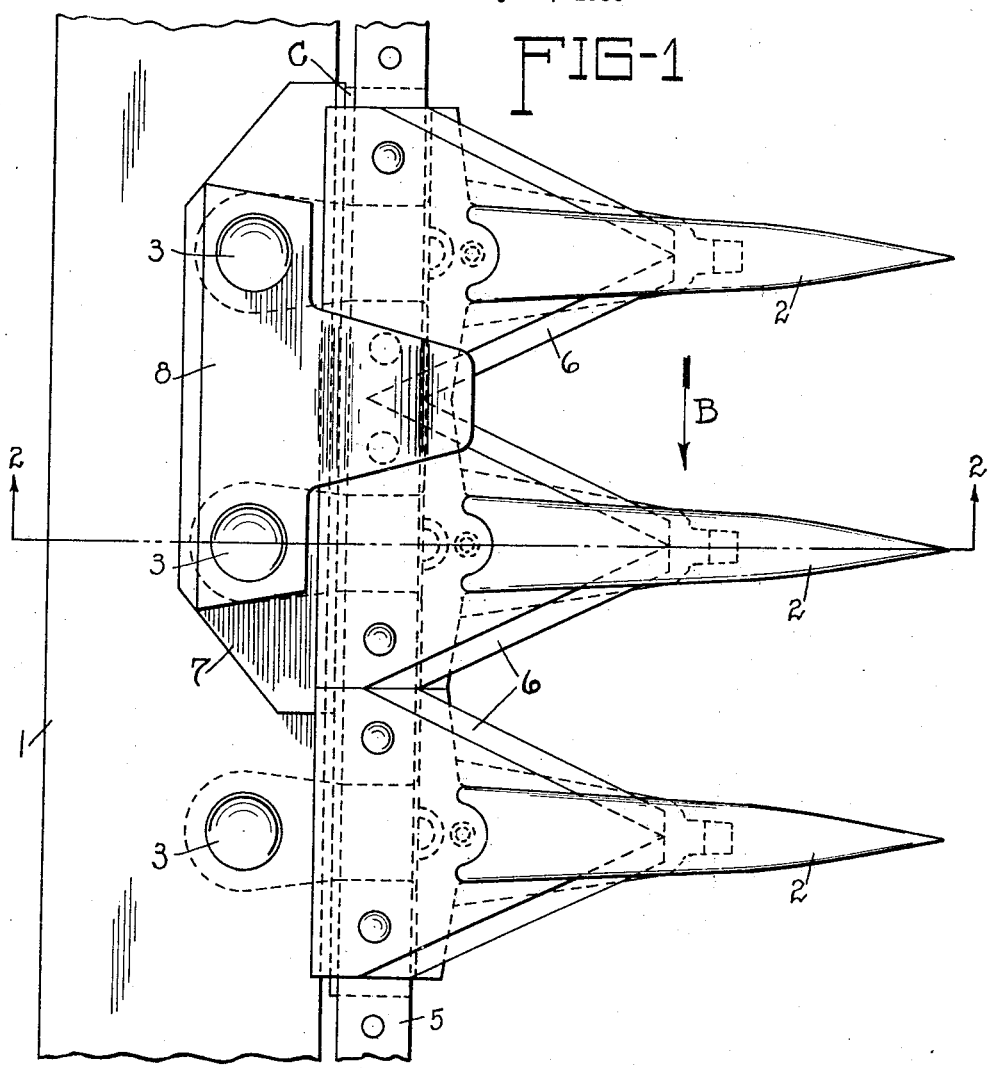
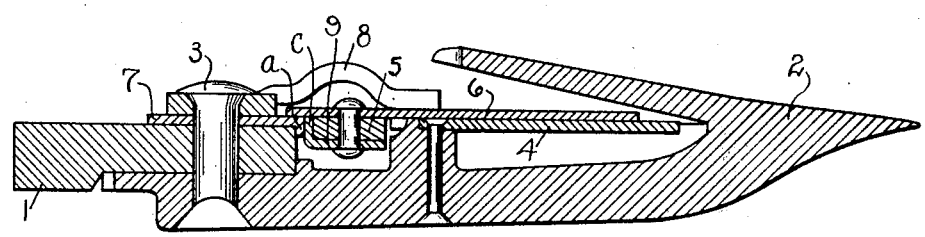
WITNESS
A. D. McLeay
INVENTOR
LOUIS A PARADISE
BY W. C. Jordiceton
ATTY.

Patented Aug. 16, 1932

1,872,172

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

WEAR PLATE FOR HARVESTER KNIFE BARS

Application filed May 22, 1930. Serial No. 454,683.

My invention relates to a new and useful improvement in the cutting mechanism of harvesting machines and more particularly to the means employed to minimize wear of certain parts of the mechanism as fully detailed hereinafter, and the object of my invention is to increase longevity of the parts subjected to the greater amount of wear.

Referring to the drawing in which similar numerals indicate identical parts:—

Figure 1 is a plan view of part of the cutting device of a harvester embodying my invention, and Figure 2 is a section on the line 2—2 of Fig. 1.

The finger bar 1 is of a well known type to which the guard fingers 2 are secured by bolts 3. A ledger plate 4 is riveted to each guard finger. On the knife bar 5 the knife sections 6 are riveted and extend rearwardly of the knife bar to rest on wear plates 7, a plurality of which are employed in every harvester cutting mechanism, and each of which is bent downwardly forwardly of the finger bar 1, as at $a$, to provide a guide and wear surface for the knife bar 5. With each wear plate is a holder 8 secured in place by the bolts 3 which also secure the wear plates 7 and the guard fingers 2 to the finger bar 1. The holders extend forwardly over the knife bar and sections and operate to hold the knife sections in proper cutting engagement with the ledger plates. The parts described are such as found in the present type of harvesters and are well known in the art and commercially.

In the operation of the cutting device of a harvester the greater amount of wear of the knife bar occurs where the rear of the bar contacts with the wear plates 7, this wear is occasioned by a backward thrust of the vegetation being cut, and if not corrected, or met by proper construction of the parts, will result in misalinement and looseness of the knife bar and a consequent detriment to that perfection of operation most desirable in the cutting mechanism of a harvester.

To reduce the wear of the knife bar to the minimum I have designed, and mounted on the knife bar, wear plates 9, the number corresponding to the number of wear plates 7. The wear plates 9 cover the width of the knife bar 5 and are secured to the under side thereof by the same rivets which fasten the knife sections to the knife bar. They are then bent upwardly to fit accurately the rear of the knife bar and to contact with the wear plates 7. The wear plates 9 are of sufficient length to present a full wearing surface against the wear plates 7 at all times.

In Figure 1 the parts are shown at the end of the cutting movement of the knife bar in the direction indicated by the arrow B, so that, as shown at $c$, the end of the wear plate 9 has passed the end of the wear plate 7 at the limit of the stroke of the pitman. At the return stroke of the pitman the opposite end of the wear plate will pass the end of the wear plate 7, the length of the wear plate 9 is thus somewhat less than the length of wear plate 7 plus the length of stroke of the knife bar. This construction prevents the wearing of a shoulder on the ends of the wear plate 9. After a mower has been in use for some time, adjustments for angle of lead of the finger bar relative to the line of forward travel must necessarily be made, and in making this adjustment the neutral position of the knife bar relative to the finger bar is shifted slightly. It is therefore essential that the wear plate 9 be smooth on its wearing edge over its entire length.

What I claim is:

1. In a device of the class described, the combination of a finger bar, guard fingers mounted on the finger bar, a knife bar, knife sections on the knife bar, a wear plate secured on the finger bar and bent to project between the finger bar and knife bar, and a wear plate on the knife bar separate from said sections and interposed between the knife bar and the wear plate on the finger bar and in contact with the wear plate on the finger bar.

2. In a device of the class described, the combination of a finger bar, guard fingers mounted on the finger bar, a knife bar, knife sections on the knife bar, a wear plate secured on the finger bar and bent downwardly between the knife bar and finger bar, and a wear plate secured on the under side of the knife bar separate from said sections and bent upwardly to project between the knife bar and the wear plate on the finger bar and in constant contact with the wear plate on the finger bar.

LOUIS A. PARADISE.